United States Patent
Kumar et al.

(10) Patent No.: US 10,171,499 B2
(45) Date of Patent: Jan. 1, 2019

(54) ZONE-BASED SECURITY ARCHITECTURE FOR INTRA-VEHICULAR WIRELESS COMMUNICATION

(71) Applicants: Pradeep Kumar, Eng (GB); Andrei Gurtov, Linkoping (SE); Madhusanka Liyanage, Oulu (FI)

(72) Inventors: Pradeep Kumar, Eng (GB); Andrei Gurtov, Linkoping (SE); Madhusanka Liyanage, Oulu (FI)

( * ) Notice: Subject to any disclaimer, the term of this patent is extended or adjusted under 35 U.S.C. 154(b) by 0 days.

(21) Appl. No.: 15/252,658

(22) Filed: Aug. 31, 2016

(65) Prior Publication Data

US 2016/0373484 A1  Dec. 22, 2016

Related U.S. Application Data (62) Division of application No. 14/540,145, filed on Nov. 13, 2014, now Pat. No. 9,871,819.

(51) Int. Cl.

| | |
|---|---|
| *H04L 29/06* | (2006.01) |
| *H04W 12/02* | (2009.01) |
| *H04W 84/18* | (2009.01) |
| *H04L 29/08* | (2006.01) |
| *H04W 12/04* | (2009.01) |
| *H04W 12/06* | (2009.01) |
| *H04W 16/20* | (2009.01) |
| *H04W 76/12* | (2018.01) |
| *H04W 16/06* | (2009.01) |
| *H04W 84/00* | (2009.01) |
| *H04W 4/04* | (2009.01) |
| *H04W 48/02* | (2009.01) |

(52) U.S. Cl.
CPC ........ *H04L 63/164* (2013.01); *H04L 63/0428* (2013.01); *H04L 63/061* (2013.01); *H04L 63/0876* (2013.01); *H04L 67/12* (2013.01); *H04W 12/02* (2013.01); *H04W 12/04* (2013.01); *H04W 12/06* (2013.01); *H04W 16/06* (2013.01); *H04W 16/20* (2013.01); *H04W 76/12* (2018.02); *H04W 84/18* (2013.01); *H04L 2209/84* (2013.01); *H04W 4/046* (2013.01); *H04W 48/02* (2013.01); *H04W 84/005* (2013.01)

(58) Field of Classification Search
CPC combination set(s) only.
See application file for complete search history.

(56) References Cited

U.S. PATENT DOCUMENTS

| | | | |
|---|---|---|---|
| 7,036,143 B1* | 4/2006 | Leung | H04L 63/0272 709/227 |
| 7,274,332 B1* | 9/2007 | Dupray | G01S 19/45 342/357.64 |
| 9,268,920 B1* | 2/2016 | Butler | G06F 21/10 |

(Continued)

*Primary Examiner* — Phy Anh Vu
(74) *Attorney, Agent, or Firm* — Hahn Loeser & Parks, LLP (57) ABSTRACT

Systems and methods provide secure and wireless intra-vehicular communication. An intra-vehicular communication system has a secured network segment including a plurality of secure zones on a vehicle, the secure zones each having a plurality of node devices. The system also has a single point of security proximate each secure zone on the vehicle providing communication security for a corresponding secure zone, and a public network segment on the vehicle configured to wirelessly transport data traffic between the secure zones.

6 Claims, 4 Drawing Sheets

(56) References Cited

U.S. PATENT DOCUMENTS

| | | | | |
|---|---|---|---|---|
| 9,871,819 B2* | 1/2018 | Liyanage | ............... | H04W 76/12 |
| 2002/0052972 A1* | 5/2002 | Yim | ..................... | H04L 12/467 |
| | | | | 709/245 |
| 2004/0198386 A1* | 10/2004 | Dupray | ................. | H04W 64/00 |
| | | | | 455/456.1 |
| 2005/0259598 A1* | 11/2005 | Griffin | ................... | B61L 15/00 |
| | | | | 370/255 |
| 2007/0112957 A1* | 5/2007 | Shastri | ................ | H04L 41/0893 |
| | | | | 709/224 |
| 2007/0239700 A1* | 10/2007 | Ramachandran | ... | H04L 41/0813 |
| 2008/0285575 A1* | 11/2008 | Biswas | .............. | H04L 29/1232 |
| | | | | 370/401 |
| 2009/0219900 A1* | 9/2009 | Kokkinen | ........... | B61L 15/0027 |
| | | | | 370/338 |
| 2009/0259528 A1* | 10/2009 | Ebersberger | ....... | G06Q 30/0284 |
| | | | | 705/13 |
| 2009/0316709 A1* | 12/2009 | Polcha | ............... | H04N 21/2381 |
| | | | | 370/401 |
| 2010/0312898 A1* | 12/2010 | Jokela | ................. | H04L 67/2823 |
| | | | | 709/227 |
| 2012/0220276 A1* | 8/2012 | Kobylarz | ................ | H04W 4/00 |
| | | | | 455/414.1 |
| 2013/0132717 A1* | 5/2013 | Brand | ................... | H04L 9/0825 |
| | | | | 713/156 |
| 2013/0305320 A1* | 11/2013 | Warrick | ................ | H04L 61/103 |
| | | | | 726/4 |
| 2015/0109962 A1* | 4/2015 | Liao | ........................ | H04L 45/04 |
| | | | | 370/254 |

* cited by examiner

ZONE-BASED SECURITY ARCHITECTURE FOR INTRA-VEHICULAR WIRELESS COMMUNICATION

RELATED APPLICATIONS

This application is a divisional application of and claims priority to U.S. Ser. No. 14/540,145, filed Nov. 13, 2014.

BACKGROUND

Technical Field

Subject matter disclosed herein relates to intra-vehicular communications.

Discussion of Art

Intra-vehicular communication plays an important role in various public and cargo transportation systems (e.g., cruises, trams, metros, articulated buses, trains, and cargo ships) to ensure safety and stable operation of the vehicle. Initially, intra-vehicular communication systems were used for signaling and controlling purposes. However, recent communication systems support many passenger-assisting applications such as passenger information services, public announcements, video surveillance, intercom, heating, ventilation, and air-conditioning (HVAC), broadband services, and data-driven control systems.

In the present day, most of the intra-vehicular communication systems are operated as wired communication systems. A conventional wired intra-vehicular communication system relies on wired lines which are laid along vehicle body and interconnecting couplers. However, physical wires are cumbersome to install, maintain, and troubleshoot. In some cases, various parts of wired networks are required to be replaced frequently. For example, couplers between carriages in articulated buses/trains/metros/trams have to be regularly replaced and maintained, since the constant motion of the carriages caused the contacts of the couplers to wear out.

Furthermore, wired systems have fixed bandwidths, limited data rates, and a limited number of ports. Wired systems cannot be expanded without reinstalling wires across the vehicle. Thus, a wired communication system is expensive and not efficient to upgrade to accommodate future demands. Especially, wired systems are not scalable and practicable enough to provide individually customized user services (e.g., broadband access, multimedia services) for thousands of passengers.

The use of wireless technologies for intra-vehicular communication is an economical, expandable, reliable, and user-friendly alternative to wired communications. Moreover, it is easy to upgrade wireless systems to support emerging passenger related applications in the future. Hence, wireless communication is a natural fit for intra-vehicular communication.

However, existing architectures are not able to adequately address security challenges in wireless intra-vehicular communication systems. Specifically, open air transmission exposes the control and user traffic to third party attackers. These attackers may not have the best intentions and may try to exploit the data transmitted over air interfaces. In particular, an alteration or an interruption of the control data may result in compromising the safety and the smooth operation of the vehicle. Therefore, it is desirable to have a system and method for providing secure intra-vehicular communications.

BRIEF DESCRIPTION

A vehicular communication system can comprise one or more network devices configured for operable coupling with a vehicle system. The one or more network devices are also configured to establish a secured network segment including a plurality of secure zones on the vehicle system. The secure zones are each configured for network linking of a respective plurality of node devices. The one or more network devices are further configured to establish one or more single points of security each associated with a respective one of the plurality of secure zones on the vehicle system, for providing communication security for the secure zones. The one or more network devices are further configured to establish a public network segment on the vehicle system configured to wirelessly transport data traffic between the secure zones.

Alternatively or complementarily, a vehicular communication system can comprise a first edge device, a second edge device, a first wireless transponder, and a second wireless transponder. The first edge device is associated with a first secure zone at a first location in a vehicle system and configured to be communicatively coupled with a first plurality of node devices of the first secure zone, for providing a first point of security for the first secure zone. The second edge device is associated with a second secure zone at a second location in the vehicle system and configured to be communicatively coupled with a second plurality of node devices of the second secure zone, for providing a second point of security for the second secure zone. The first wireless transponder is operatively coupled to the first edge device. The second wireless transponder is operatively coupled to the second edge device. The first edge device and the second edge device are configured to establish a first secure wireless communication tunnel between the first secure zone and the second secure zone via the first wireless transponder and the second wireless transponder.

Further, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones.

BRIEF DESCRIPTION OF THE DRAWINGS

Reference is made to the accompanying drawings in which particular configurations and further benefits of solutions disclosed are illustrated as described in more detail in the description below, in which.

DETAILED DESCRIPTION

The disclosure relates to at least systems and methods providing secure and wireless intra-vehicular communication. Intra-vehicular communication includes intra-vehicle communication (communication in a single vehicle). Intra-vehicular communication also includes intra-consist communication, which refers to communications between vehicles of a consist. A consist is a vehicle system comprising plural vehicles mechanically and/or communicatively/logically linked together, such as for coordinated travel along a route. ("Vehicle system" collectively refers to both single vehicles and vehicle consists.) An intra-vehicular communication system can comprise one or more network devices (e.g., routers and/or switches) that provide the technical effect of establishing a secured network segment including a plurality of secure zones on a vehicle system, the secure zones each having a plurality of node devices. The system also has one or more secure zones on the vehicle system, each secure zone associated with (e.g., physically in or proximate to) a respective single point of security. Each respective single point of security is for providing communication security for a corresponding secure zone (e.g., the network devices may be configured to establish and/or function as the single points of security), and a public network segment on the vehicle system configured to wirelessly transport data traffic between the secure zones.

With reference to the drawings, like reference numerals designate identical or corresponding parts throughout the several views. However, the inclusion of like elements in different views does not mean a given embodiment necessarily includes such elements or that all embodiments include such elements.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing device" or "computing device" or "processor" as used herein includes, but is not limited to, any programmed or programmable device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. The terms "controller" or "control system" or "control device" are used broadly herein and may be anything from a simple switching device, to one or more processors running computer-executable software instructions, to complex programmable and/or non-programmable logic circuitry. The terms "signal", "data", and "information" may be used interchangeably herein and may be in digital or analog form.

The term "functionality" as used herein may refer to the logical actions and supporting display screens of a system implemented in software and/or hardware. The term "electronically" as used herein may refer to performing a task using an electronic device or network, or any equivalent thereof (e.g., a fiber optic device or network, or some other form of digital device or network). The term "nodes" or "node devices" as used herein may refer to device (including, but not limited to legacy equipment devices) on a vehicle system that are operatively connected to wired infrastructure within a secure zone such as, for example, electrical or electronic equipment associated with a rail vehicle, or other equipment capable of being controlled by electrical or electronic equipment of the rail vehicle.

The disclosure provides a secure intra-vehicular communication architecture that solves security related issues for wireless intra-vehicular communication systems. Security services such as, for example, authentication, confidentiality, integrity, and availability may be provided for intra-vehicular wireless communication systems. In contrast to the traditional end-to-end security solution, the claimed solutions may provide a "bump-in-the-wire" security mechanism to implement a site-to-site security solution which eliminates the security protocol implementations at the end nodes. For example, an authentication procedure can be provided to authenticate/authorize the nodes, a tunnel establishment procedure to implement internet protocol security (IPsec) tunnels or other data communication tunnels between the secure zones, and a dynamic address learning mechanism to facilitate packet routing between sites.

The intra-vehicular communication system may be used to transport two or more types of data traffic, including control data and user data. Two data planes (e.g., communication bandwidths or channels) can be defined for the communication system. The first data plane is for the signaling/controlling data traffic, which has the highest priority. The first data plane may carry the vehicle system's operational and maintenance data, for example. The second data plane is for the user data traffic, which has a lower priority than the control data traffic. The second data plane may carry user broadband, multimedia, and other non-controlling data traffic, for example.

The intra-vehicular network can be divided into two segments. The first segment is the secured network segment which may have multiple secure zones. Authorized personnel have access to the secure zones and intruders (or other unauthorized persons) do not have access to the secure zones. The secure zones can be physically separated from the public. For example, a control room or an engine room in a cruise ship, a train, or a metro may define a secure zone. The rest of the network belongs to the second segment, which is a public network segment. Public persons have access to the second segment and data traffic between secure zones is transported through the public network segment. Network security can be provided in network elements as close as possible to the wireless interfaces. As a result, the number of nodes that participate in the security functions may be reduced. Each secure zone is associated with an edge device (which may include, e.g., a router, switch, or other network device) that is attached to a wireless transponder. While "transponder" as referred to herein generally describes conventional transponders which provide predefined data in response to interrogation without human interaction, it will be apparent upon review of the disclosures herein that any device for wirelessly communicating data signals can be substituted, and any instance of "transponder" can more generally be a transceiver. (The edge devices are discussed in detail later herein.) Data security features are implemented at the edge of the secure zones. Therefore, an edge device is also referred to as a point of security for a secure zone.

The point of security is the place where the security mechanism is implemented. The security mechanism is used at points of security in such a manner that the security implementation is completely transparent to other network elements, hosts, or other nodes within the secure zones and does not require protocol modifications at the nodes.

Site-to-site security can be provided at the network layer instead of, for example, via hop-to-hop MAC (Media Access Control) link layer security. In the link layer, key distribution and management are more complex than in the network layer because each hop device receives a key and, when keys change, each device has to be updated. This can be a costly and time-consuming operation and may not be feasible in the presence of several wireless devices or repeaters. Other weaknesses with link layer security include: packets are decrypted at each hop, thus, more points of vulnerability exist; and it is dependent on the physical link layer networking technology (e.g., IEEE 802.11n).

Multiple secure zones may be implemented according to the requirements of the vehicle system. The network devices of the intra-vehicular communication system can be configured to securely transfer the data traffic between the secure zones. The secure communication of the network devices is explained herein with respect to tunnel establishment and an address learning mechanism. A secure wireless communication tunnel can be established between two points of security (e.g., between two of the network devices) before any data communication takes place. Each of the two points of security (e.g., two of the network devices) is configured to perform key negotiation exchange and form the security tunnel between each other. Examples of key exchange protocols to establish the tunnel are Host Identity Protocol (HIP) and Internet Key Exchange (IKEv2).

As part of the tunnel establishment procedure, two (or more) of the network devices can be configured to generate a common key material for data traffic by using the Diffie-Hellman (D-H) key exchange. In addition, end-point nodes (e.g., devices, legacy hardware associated with vehicle systems, communication electronics, network-enabled components) mutually authenticate based on host identities. Furthermore, initial key exchange mechanisms (HIP and IKEv2) are modified to exchange a digital certificate to allow the communication with each other. Initially, the network administrator provides a digital certificate for each node during the node configuration process. However, it is possible to automate the distribution of the digital certificates by using an authentication server.

A digital certificate may contain the configuration information of Virtual Private Networks (VPNs) such as traffic prioritization information and VPN identifiers (IDs). The digital certificates are encrypted and, therefore, an eavesdropper cannot extract the configuration information of the VPNs. When secure tunnel establishment is successfully completed, the two ends can securely transport data traffic between two secure zones over secure wireless interfaces or channels.

Alternatively or complementarily, the secure architecture may be implemented either as a Layer 2 VPN (L2VPN) or a Layer 3 VPN (L3VPN) based on the deployed network devices in the network. The incoming data traffic differentiates based on VPN ID in L2VPNs and UDP (User Datagram Protocol) port in L3 VPNs.

The network devices can be configured to implement a dynamic address learning mechanism or process, which, for example, may use an address learning table to build forwarding tables and route data traffic between the secure zones. The dynamic address learning mechanism is implemented between points of security. A point of security is the responsible entity (network device) for all the node devices which are placed in the secure zone associated with the point of security. Each end-point node maintains a forwarding table to map the address of a node device to the address of the responsible point of security. If an end-point node receives a packet of data with an unknown address, the end-point broadcasts a dynamic address request to all of the secure zones and retrieves the address of the corresponding point of security. Furthermore, all of the address learning packets are encrypted to avoid eavesdropping and message alteration attacks on the routing protocol.

Figure 1:
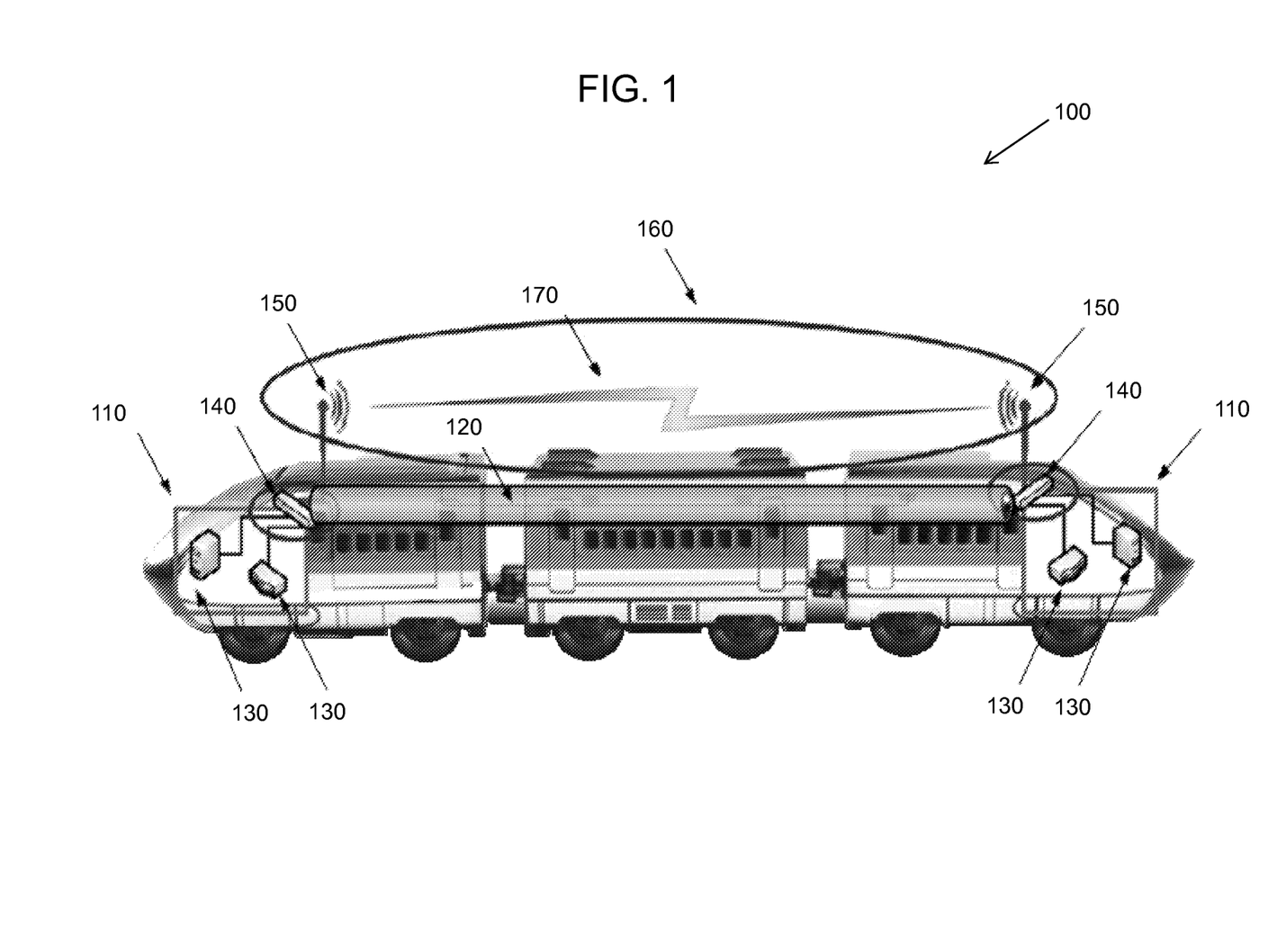
FIG. 1 illustrates a network topology of a secure intra-vehicular wireless communication architecture.

FIG. 1 illustrates a network topology of a secure intra-vehicular wireless communication architecture (system) 100 on a vehicle system. Network hardware described herein alone or in combination with devices connected to the network provide the technical effect of defining secure zones 110 connected by secure tunnel 120. One secure zone may be at the head of the vehicle system and the other secure zone may be at the tail of the vehicle system, for example. The secure zones 110 are connected (in terms of at least a portion of their respective data communications) through a secure tunnel 120. Although, for clarity of illustration, the network topology 100 of FIG. 1 includes only two secure zones 110 and represents only a single VPN instance, the principles embodied in the network topology 100 may be extended into larger network topologies with many secure zones and multiple VPN's.

The secure zones 110 contain legacy user devices (node devices) 130 which are not necessarily aware of the existence of the security architecture. The legacy user devices 130 may be connected to the wired infrastructure. The points of security 140 are the edge devices that are associated with (e.g., are in or proximate to) the secure zones 110 and act as a gateway for each secure zone. The points of security 140 may be network devices, such as routers and/or switches, for example. Nodes in a secure zone utilize a gateway (point of security) for that secure zone to send a message. The security mechanism is implemented at the points of security 140, and supports the secure tunnel 120 and associated key exchange protocols. A gateway is located as close as possible to the wireless interface of an associated secure zone to avoid attacks by other wireless links. In embodiments that use HIP, the points of security are HIP enabled devices. However, other IP security and key exchange mechanisms may be used as well.

Figure 2:
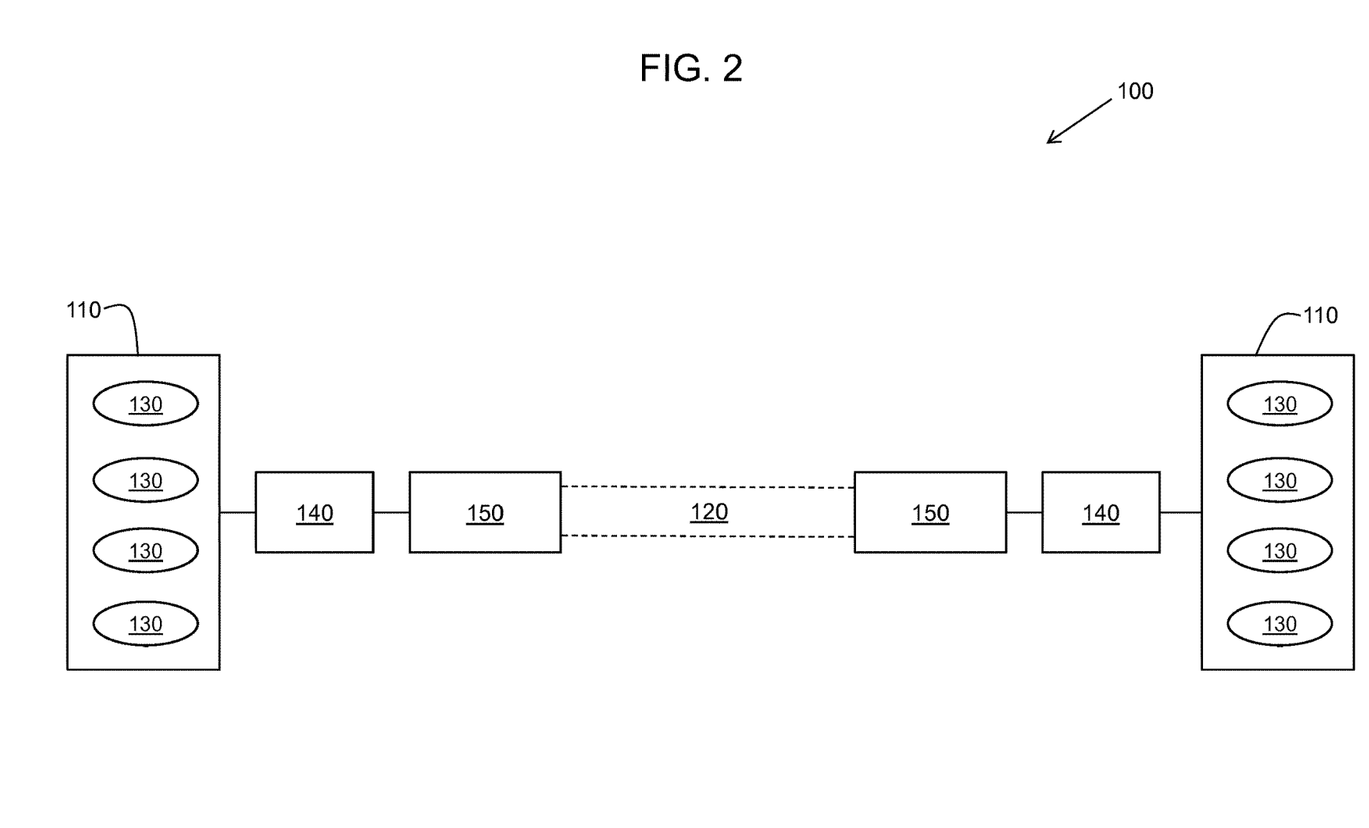
FIG. 2 illustrates a system block diagram of the network topology of the secure intra-vehicular wireless communication architecture of FIG. 1.

Wireless interfaces 150 (e.g., wireless transponders) are attached to the points of security 140 (e.g., network devices) of the secure zones 110. WiFi may be implemented as the wireless technology and is supported by the wireless interfaces 150. Alternatively or complementarily, other wireless radio technology can be employed. The public network segment 160 contains the wireless communication network including the wireless channel 170. Communications through the public network segment 160 is secured by the IPsec technologies as discussed herein. FIG. 2 illustrates a system block diagram of the network topology of the secure intra-vehicular wireless communication architecture 100 of FIG. 1 showing the secure wireless tunnel 120. Specifically, a respective edge device 140 (e.g., network device configured to act as a point of security) is associated with each of first and second secure zones 110 (e.g., the edge devices are respectively located in or proximate to the secure zones, and/or communicatively linked with node devices therein). There is a respective plurality of node devices 130 in each secure zone. A respective wireless transponder 150 is operatively coupled to each edge device. Through control of the wireless transponders, the edge devices 140 are configured to establish the secure wireless communication tunnel 120.

Figure 3:
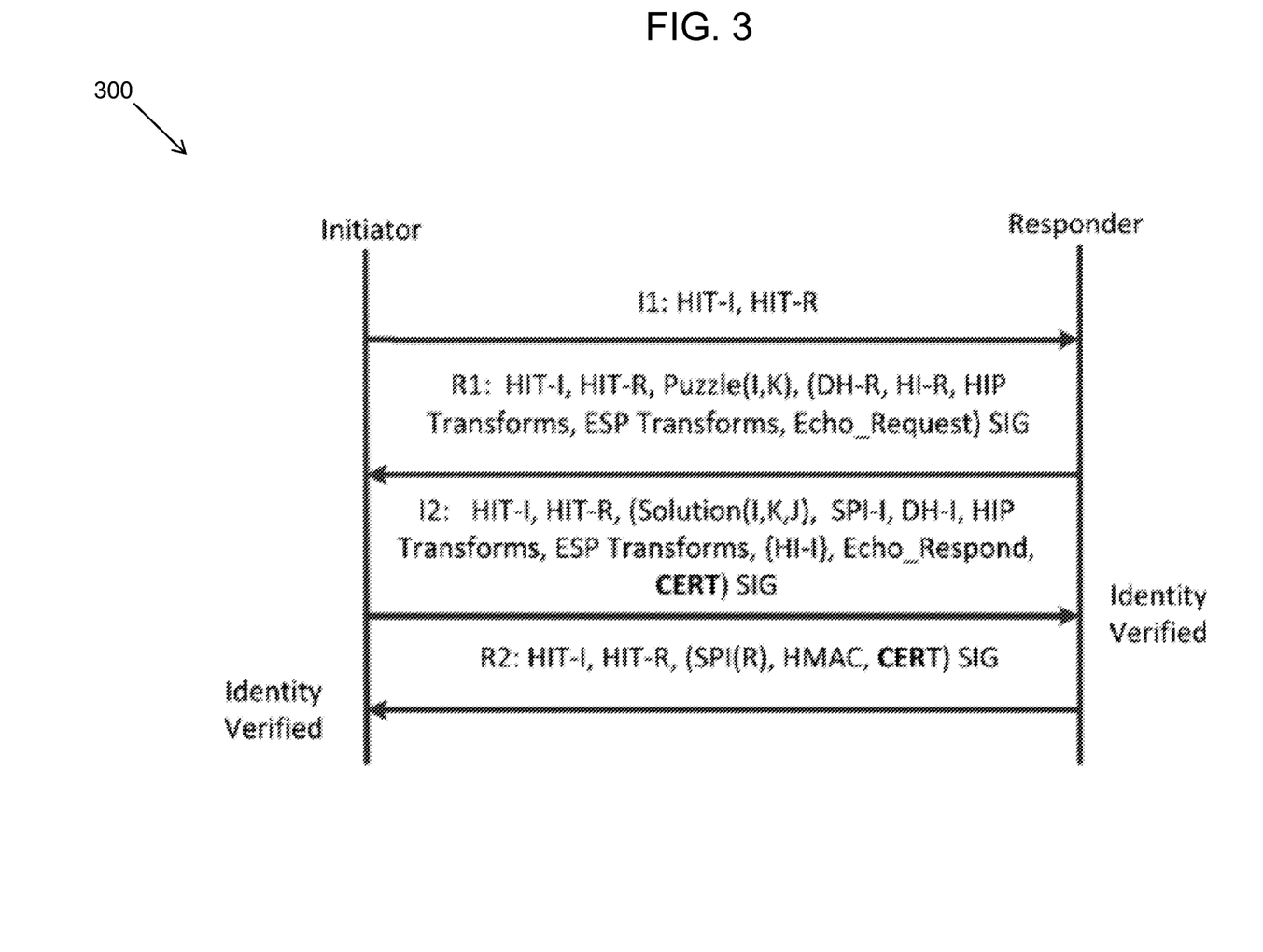
FIG. 3 schematically illustrates a tunnel establishment and authentication procedure using the network topology of FIG. 1 and FIG. 2.

FIG. 3 schematically illustrates a tunnel establishment and authentication procedure (method) 300 using the network topology 100 of FIG. 1 and FIG. 2. The procedure 300 can be based on the HIP Base Exchange (BEX) procedure. The tunnel establishment and authentication procedure 300 establishes HIP tunnels between points of security using a four-way handshake procedure. As a part of the procedure 300, two points generate a common key material for IPsec traffic by using the Diffie-Hellman (D-H) key exchange. Furthermore, end points mutually authenticate each other during HIP BEX. A digital certificate can be exchanged to allow the end points to communicate with each other. Initially, the network administrator may provide a digital certificate for each node device during the node configuration process. However, it may be possible to automate the distribution of the digital certificates by using an authentication server. A digital certificate may contain the configuration information of the VPNs such as traffic prioritization information and VPN IDs. The digital certificates may be encrypted by using the D-H key.

Figure 4:
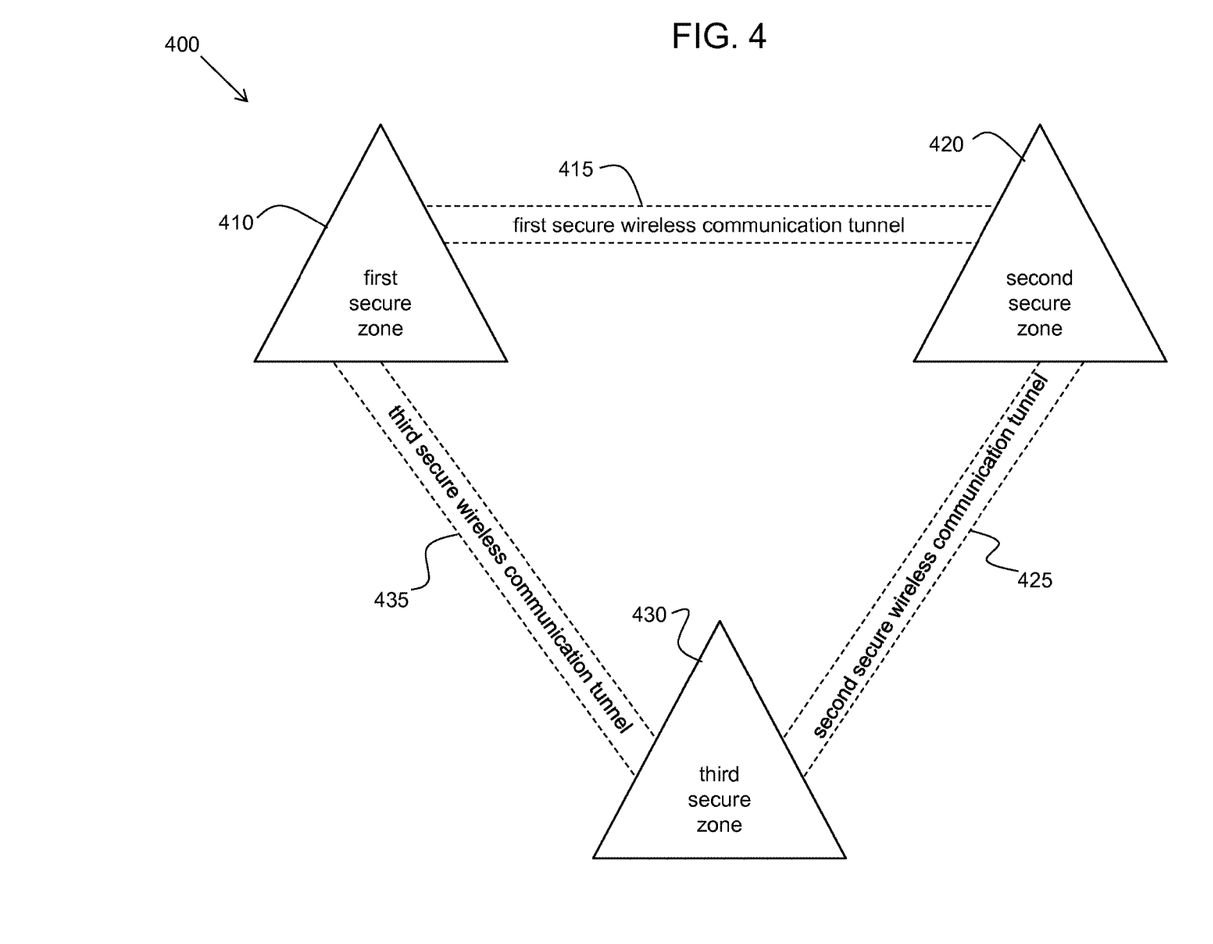
FIG. 4 illustrates a system block diagram of a network topology of a secure intra-vehicular wireless communication architecture having three secure zones.

FIG. 4 illustrates a system block diagram of a network topology of a secure intra-vehicular wireless communication architecture (system) 400 having three secure zones 410, 420, and 430. In FIG. 4, the three secure zones are each associated with an edge device (e.g., network device configured to act as a point of security for a secure zone) and a wireless transponder. In FIG. 4, a first secure wireless communication tunnel 415 is established between the first secure zone 410 and the second secure zone 420, a second secure wireless communication tunnel 425 is established between the second secure zone 420 and the third secure zone 430, and a third secure wireless communication tunnel 435 is established between the first secure zone 410 and the third secure zone 430. In this manner, three different secure zones on a vehicle system may establish secure communications between each other through the three secure tunnels.

The aforementioned systems, components, architectures, environments, and the like have been described with respect to interaction between several components and/or elements. Such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein for the sake of brevity, but known by one of ordinary skill in the art.

In view of the exemplary devices and elements described herein, methodologies that may be implemented in accordance with the disclosed subject matter will be better appreciated with reference to the flow charts. While for purposes of simplicity of explanation, the methodologies are shown and described as a series of block steps, the claimed subject matter is not limited by the order of the block steps, as some block steps may occur in different orders and/or concurrently with other block steps from what is depicted and described herein. Moreover, not all illustrated block steps may be required to implement the methods described herein.

An intra-vehicular communication system can be provided in accordance with the disclosures herein. The system includes a secured network segment including a plurality of secure zones on a vehicle, the secure zones each having a plurality of node devices. The system also includes a single point of security proximate each secure zone on the vehicle, providing communication security for a corresponding secure zone. The system further includes a public network segment on the vehicle configured to wirelessly transport data traffic between the secure zones. The communication security, provided by the single point of security proximate each secure zone, may be established at least at a network layer level. The communication security, provided by the single point of security proximate each secure zone, may be established at least in part by generating a secure wireless communication tunnel between any two of the plurality of secure zones. The data traffic may include private vehicle control and signaling data. The data traffic may include public user data. The plurality of node devices may include one or more legacy equipment devices operatively connected to wired infrastructure. The single point of security proximate each secure zone may include one of a router or a switch.

An intra-vehicular communication system can be provided in accordance with the disclosures herein. The system includes a first secure zone having a first plurality of node devices at a first location on a vehicle, and a second secure zone having a second plurality of node devices at a second location on the vehicle. The system also includes a first edge device proximate the first secure zone and communicatively wired to the first plurality of node devices of the first secure zone, providing a point of security for the first secure zone. The system further includes a second edge device proximate the second secure zone and communicatively wired to the second plurality of node devices of the second secure zone, providing a point of security for the second secure zone. The system also includes a first wireless transponder operatively wired to the first edge device, and a second wireless transponder operatively wired to the second edge device. The first edge device and the second edge device are configured to establish a first secure wireless communication tunnel between the first secure zone and the second secure zone via the first wireless transponder and the second wireless transponder. Communication security between the first secure zone and the second secure zone may be established at least at a network layer level. Two or more of the first plurality of node devices may be configured to communicate with each other within the first secure zone. Two or more of the second plurality of node devices may be configured to communicate with each other within the second secure zone. One or more of the first plurality of node devices may be configured to communicate with one or more of the second plurality of node devices via the first wireless transponder and the second wireless transponder after establishment of the first secure wireless communication tunnel. Each of the first edge device and the second edge device may be one of a router or a switch. The first plurality of node devices and the second plurality of node devices may include electrical equipment associated with a rail vehicle. Each of the first secure zone and the second secure zone may include one or an engine room or a control room of the vehicle. The system may include a third secure zone having a third plurality of node devices at a third location on the vehicle, a third edge device proximate the third secure zone and communicatively wired to the third plurality of node devices of the third secure zone and providing a point of security for the third secure zone, and a third wireless transponder operatively wired to the third edge device. The first edge device and the third edge device may be configured to establish a second secure wireless communication tunnel between the first secure zone and the third secure zone via the first wireless transponder and the third wireless transponder. The second edge device and the third edge device may be configured to establish a third secure wireless communication tunnel between the second secure zone and the third secure zone via the second wireless transponder and the third wireless transponder.

An intra-vehicular communication method is provided in accordance with the disclosures herein. The method includes establishing two or more secure zones on a vehicle, each secure zone having one or more node devices. The method also includes performing an authentication procedure to authenticate and authorize the one or more node devices, establishing a secure wireless communication tunnel between the two or more secure zones, and establishing a dynamic address learning mechanism to facilitate data routing between the two or more secure zones. The secure wireless communication tunnel may be established, at least in part, by generating a common digital certificate and using a Diffie-Hellman key exchange. The secure wireless communication tunnel may be established, at least in part, by mutually authenticating the secure zones based on host identities. The two or more secure zones may be established by providing a single point of security proximate each secure zone on the vehicle, providing communication security for a corresponding secure zone. The dynamic address learning mechanism may be established, at least in part, by maintaining a forwarding table for each secure zone to map an address of a node device to an address of a responsible point of security. The method may also include a first node device, of the one or more node devices, receiving a data packet with an unknown point of security address corresponding to an unknown point of security, the first node device broadcasting a dynamic address request to the two or more secure zones, and the first node device receiving an address of the unknown point of security in response to broadcasting the dynamic address request.

A vehicular communication system can comprise one or more network devices (e.g., routers and/or switches) configured for operable coupling with a vehicle system (e.g., single vehicle or vehicle consist). The one or more network devices are configured to establish a secured network segment including a plurality of secure zones on the vehicle system. The secure zones are each configured for network linking of a respective plurality of node devices. (For example, a first of the secure zones may be configured for network linking of a first plurality of node devices, and a second of the secure zones may be configured for network linking of a second plurality of node devices, where none of the first plurality of node devices are also any of the second plurality of node devices.) The node devices may include one or more legacy equipment devices operatively connected to wired infrastructure. The one or more network devices are further configured to establish one or more single points of security each associated with a respective one of the plurality of secure zones on the vehicle system, for providing communication security for the secure zones. The one or more network devices are further configured to establish a public network segment on the vehicle system configured to wirelessly transport data traffic (e.g., private vehicle control data and/or signaling data and/or public user data) between the secure zones.

Alternatively or complementarily, a vehicular communication system can comprise one or more network devices (e.g., routers and/or switches) configured for operable coupling with a vehicle system (e.g., single vehicle or vehicle consist). The one or more network devices are configured to establish a secured network segment including a plurality of secure zones on the vehicle system. The secure zones are each configured for network linking of a respective plurality of node devices. (For example, a first of the secure zones may be configured for network linking of a first plurality of node devices, and a second of the secure zones may be configured for network linking of a second plurality of node devices, where none of the first plurality of node devices are also any of the second plurality of node devices.) The node devices may include one or more legacy equipment devices operatively connected to wired infrastructure. The one or more network devices are further configured to establish one or more single points of security each associated with a respective one of the plurality of secure zones on the vehicle system, for providing communication security, at least at a network layer level, for the secure zones. The one or more network devices are further configured to establish a public network segment on the vehicle system configured to wirelessly transport data traffic (e.g., private vehicle control data and/or signaling data and/or public user data) between the secure zones.

Further, a vehicular communication system can comprise one or more network devices (e.g., routers and/or switches) configured for operable coupling with a vehicle system (e.g., single vehicle or vehicle consist). The one or more network devices are configured to establish a secured network segment including a plurality of secure zones on the vehicle system. The secure zones are each configured for network linking of a respective plurality of node devices. (For example, a first of the secure zones may be configured for network linking of a first plurality of node devices, and a second of the secure zones may be configured for network linking of a second plurality of node devices, where none of the first plurality of node devices are also any of the second plurality of node devices.) The node devices may include one or more legacy equipment devices operatively connected to wired infrastructure. The one or more network devices are further configured to establish one or more single points of security each associated with a respective one of the plurality of secure zones on the vehicle system, for providing communication security for the secure zones. The one or more network devices are configured to establish the communication security be established at least in part by generating a secure wireless communication tunnel between any two of the plurality of secure zones. The one or more network devices are further configured to establish a public network segment on the vehicle system configured to wirelessly transport data traffic (e.g., private vehicle control data and/or signaling data and/or public user data) between the secure zones.

Still further, a vehicular communication system can comprise a first edge device (e.g., first router and/or first switch) associated with a first secure zone at a first location in a vehicle system and configured to be communicatively coupled with a first plurality of node devices of the first secure zone, for providing a first point of security for the first secure zone. The system further comprises a second edge device (e.g., second router and/or second switch) associated with a second secure zone at a second location in the vehicle system and configured to be communicatively coupled with a second plurality of node devices of the second secure zone, for providing a second point of security for the second secure zone. The system further comprises a first wireless transponder operatively coupled to the first edge device, and a second wireless transponder operatively coupled to the second edge device. The first edge device and the second edge device are configured to establish a first secure wireless communication tunnel between the first secure zone and the second secure zone via the first wireless transponder and the second wireless transponder. The secure zones may be, for example, engine rooms, control rooms, or the like of the vehicle system.

Alternatively or complementarily, the first edge device and the second edge device are configured to establish communication security between the first secure zone and the second secure zone at least at a network layer level.

Further, two or more of the first plurality of node devices can be configured to communicate with each other within the first secure zone, and two or more of the second plurality of node devices are configured to communicate with each other within the second secure zone. One or more of the first plurality of node devices are configured to communicate with one or more of the second plurality of node devices via the first wireless transponder and the second wireless transponder after establishment of the first secure wireless communication tunnel.

In addition, the vehicle system can comprise at least one rail vehicle, and the first plurality of node devices and the second plurality of node devices include electrical equipment associated with the at least one rail vehicle.

Additionally, a vehicular communication system can comprise a first edge device (e.g., first router and/or first switch) associated with a first secure zone at a first location in a vehicle system and configured to be communicatively coupled with a first plurality of node devices of the first secure zone, for providing a first point of security for the first secure zone. The system further comprises a second edge device (e.g., second router and/or second switch) associated with a second secure zone at a second location in the vehicle system and configured to be communicatively coupled with a second plurality of node devices of the second secure zone, for providing a second point of security for the second secure zone. The system further comprises a third edge device associated with a third secure zone at a third location in the vehicle system and configured to be communicatively coupled with a third plurality of node devices of the third secure zone, for providing a third point of security for the third secure zone. The system further comprises a first wireless transponder operatively coupled to the first edge device, a second wireless transponder operatively coupled to the second edge device, and a third wireless transponder operatively coupled to the third edge device. The first edge device and the second edge device are configured to establish a first secure wireless communication tunnel between the first secure zone and the second secure zone via the first wireless transponder and the second wireless transponder. The first edge device and the third edge device are configured to establish a second secure wireless communication tunnel between the first secure zone and the third secure zone via the first wireless transponder and the third wireless transponder. Also, the second edge device and the third edge device are configured to establish a third secure wireless communication tunnel between the second secure zone and the third secure zone via the second wireless transponder and the third wireless transponder. The secure zones may be, for example, engine rooms, control rooms, or the like of the vehicle system.

Still further, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones. The secure zones may be established in regards to data communications security, as set forth herein, and in addition, the secure zones may be associated with (e.g., located in) areas that are physically secure (e.g., locked rooms or rooms where access is otherwise restricted to authorized persons).

In addition, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones. The secure wireless communication tunnel is established, at least in part, by generating a common digital certificate and using a Diffie-Hellman key exchange.

Continuing, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones. The secure wireless communication tunnel is established, at least in part, by mutually authenticating the two or more secure zones based on host identities.

Still further, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones. The two or more secure zones are established by providing a respective single point of communication security associated with each secure zone on the vehicle system.

Continuing, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones. The dynamic address learning mechanism is established, at least in part, by maintaining a respective forwarding table for each secure zone to map an address of a node device to an address of a responsible point of security.

Additionally, a method for vehicular communication can comprise establishing two or more secure zones on a vehicle system, each secure zone having a respective one or more node devices, performing an authentication procedure to authenticate and authorize the one or more node devices, establishing at least one secure wireless communication tunnel between the two or more secure zones, and establishing a dynamic address learning mechanism for data routing between the two or more secure zones. The method further comprises a first node device of the one or more node devices receiving a data packet with an unknown point of security address corresponding to an unknown point of security, the first node device broadcasting a dynamic address request to the two or more secure zones, and the first node device receiving an address of the unknown point of security in response to broadcasting the dynamic address request.

Alternatively or complementarily, a method for vehicular communication can comprise establishing, with one or more network devices, two or more secure zones on a vehicle system (each secure zone having a respective one or more node devices), performing, with the one or more network devices, an authentication procedure to authenticate and authorize the one or more node devices, establishing, with the one or more network devices, at least one secure wireless communication tunnel between the two or more secure zones, and routing data (by the one or more network devices) between the two or more secure zones based at least in part on dynamically learned addresses of the node devices and/or the one or more network devices.

In the specification and claims, reference will be made to a number of terms that have the following meanings The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description provides various examples to enable one of ordinary skill in the art to practice the solution(s) disclosed, including making and using any devices or systems and performing any incorporated methods. The patentable scope of the disclosure is defined at least by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

What is claimed is:

1. A method for vehicular communication, comprising:
    establishing two or more secure zones on a vehicle system, each secure zone belonging to a secured network segment which is not a public network segment and to which predefined authorized users have access and unauthorized users do not have access and having a respective one or more node devices;
    performing an authentication procedure to authenticate and authorize the one or more node devices;
    establishing at least one secure wireless communication tunnel between the two or more secure zones; and
    establishing a dynamic address learning mechanism for data routing between the two or more secure zones.

2. The method of claim 1, wherein the at least one secure wireless communication tunnel is established, at least in part, by generating a common digital certificate and using a Diffie-Hellman key exchange.

3. The method of claim 1, wherein the at least one secure wireless communication tunnel is established, at least in part, by mutually authenticating the two or more secure zones based on host identities.

4. The method of claim 1, wherein the two or more secure zones are established by providing a respective single point of communication security associated with each secure zone on the vehicle system.

5. The method of claim 4, wherein the dynamic address learning mechanism is established, at least in part, by maintaining a respective forwarding table for each secure zone to map an address of a node device to an address of a responsible point of security.

6. The method of claim 5, further comprising:
    a first node device, of the one or more node devices, receiving a data packet with an unknown point of security address corresponding to an unknown point of security;
    the first node device broadcasting a dynamic address request to the two or more secure zones; and
    the first node device receiving an address of the unknown point of security in response to broadcasting the dynamic address request.

* * * * *